United States Patent [19]
Hafs et al.

[11] 3,718,740
[45] Feb. 27, 1973

[54] ANIMAL SEMEN PREPARATIONS OF INCREASED FERTILITY

[75] Inventors: Harold D. Hafs; Louis J. Boyd, both of Okemos, Mich.

[73] Assignee: Research Corporation, New York, N.Y.

[22] Filed: March 18, 1971

[21] Appl. No.: 125,861

[52] U.S. Cl. ...................424/105, 195/1.8, 424/94
[51] Int. Cl. .............................................A61k 17/00
[58] Field of Search .................424/105, 94; 195/1.8

[56] References Cited

OTHER PUBLICATIONS

Doepfmer et al. Chem. Abst. Vol. 60 (9164) page 5986d

*Primary Examiner*—Sam Rosen
*Attorney*—Stowell & Stowell

[57] ABSTRACT

The fertility of animal semen preparations is increased by adding $\beta$-glucuronidase thereto.

5 Claims, No Drawings

ANIMAL SEMEN PREPARATIONS OF INCREASED FERTILITY

This invention relates to a method for increasing the fertility of animal semen preparations intended for use in the breeding of domestic animals.

In practicing artificial insemination, it is conventional practice to make semen preparations by diluting freshly ejaculated semen with a diluent and store the extended preparation under refrigeration or in the frozen condition. Egg yolk dispersed in a suitably buffered aqueous system (generally citrate at about pH 6.8) containing small amounts of minerals, nutrients and antibiotics is commonly used as the diluents or extender.

We have discovered that the motility and fertility of the spermatozoa in animal semen preparations are increased when $\beta$-glucuronidase is added thereto. $\beta$-glucuronidase is an enzyme which catalyzes the hydrolytic cleavage of the glucoside bond of glucuronides. While the exact mechanism whereby $\beta$-glucuronidase increases semen fertility is not known, it appears related to its activity as a carbohydrase.

More specifically, the present invention is a method for increasing the fertility of animal semen preparations which comprises adding an effective amount of $\beta$-glucuronidase thereto. The invention also contemplates the semen preparations of increased fertility thereby produced.

The present invention is illustrated by special reference to bull semen preparations because of the great economic importance of cattle breeding. However, the method of the present invention is applicable to increasing the fertility of animal semen preparations generally.

In practicing the present invention, freshly ejaculated neat semen is diluted with from about 10 to 200 parts of egg yolk-citrate or other suitable diluent solution. The extent of dilution depends primarily on the concentration of spermatozoa in the semen being treated. While 10 million spermatozoa per milliliter of preparation are generally thought sufficient to insure conception, the better practice is to formulate the preparation to contain at least 20 million spermatozoa per milliliter.

We have discovered that the addition of as little as 10 Fishman units of $\beta$-glucuronidase per milliliter of semen preparation results in a perceptible increase in motility and fertility of the spermatozoa in the preparation as compared to an untreated control. The increase in fertility obtained is approximately linear with the amount of $\beta$-glucuronidase added at lower concentrations but levels off at higher concentrations (300 Fishman units per milliliter maximum tested) depending on the length of storage of the semen preparation. The longer the period of storage prior to utilization, the greater the benefit obtained by adding $\beta$-glucuronidase at higher concentrations.

Our invention is further illustrated by means of the following non-limiting examples:

Freshly ejaculated bull semen was treated with 0, 30 and 300 Fishman units of mollusc $\beta$-glucuronidase per milliliter of 20 percent egg yolk-2.32 percent sodium citrate dihydrate diluent containing 500 $\mu$g of streptomycin and 500 units of penicillin. (Stock enzyme preparation was diluted by solution in 0.85 percent saline and added to the semen diluent preparation within 2 hours prior to collection of the semen). Ten ejacula were utilized in his experiment and spermatozoan motility was determined microscopically in duplicate after 1 and 7 days of storage at 5°C. As illustrated in the table below, the addition of as little as 30 units/ml of $\beta$-glucuronidase resulted in a significant improvement in motility during storage, particularly for the longer period, as compared to the control of the same age.

| Fishman units $\beta$-glucuronidase | % motile spermatozoa after storage | |
|---|---|---|
| | 1 day | 7 days |
| 0 (control) | 48 | 17 |
| 30 | 54 | 21 |
| 300 | 53 | 35 |

In another series of experiments, one milliliter of 0.85 percent saline containing 6,000 Fishman units of mollusc $\beta$-glucuronidase was added to each 99 milliliters of 20 percent egg yolk-2.32 percent sodium citrate dihydrate semen diluent; 1 milliliter of saline without enzyme was added to each 99 milliliters of control diluent. Glycerolation 2 to 4 hours later with an equal volume of the same diluent containing 14 percent glycerol but no $\beta$-glucuronidase brought the concentration of enzyme to 30 units/ml in the enzyme treated preparations. Seven semen preparations treated with $\beta$-glucuronidase and 15 control semen preparations, each preparation containing about $30 \times 10^6$ spermatozoa/ml, were equilibrated for about 20 hours and then frozen. The 60- to 90-day nonreturn fertility rate in 1,292 cows inseminated with control semen preparation was 67.2 percent. This was significantly ($P<0.05$) less than the 74.1 percent nonreturn rate in 279 cows inseminated with semen preparation containing 30 units of $\beta$-glucuronidase per milliliter.

In another series of experiments, all of the semen samples obtained from 14 bulls in routine service were treated alike on any given semen collection day. Enzyme treatment was assigned at random to three semen collection days. In each enzyme treatment series, 1 milliliter of saline (control) or saline containing enzyme was added to the semen diluent as in the previous series. Ampules of the frozen semen preparations were stored at $-195°C$. for 2 weeks to 6 months before thawing in water at 5°C. preparatory to insemination. Details of the insemination and the results obtained are summarized below:

| Fishman units $\beta$-glucuronidase | No. of Bulls | No. of Ejacula | First Services | % fertility 60- to 90-day nonreturn |
|---|---|---|---|---|
| 0 (control) | 14 | 26 | 3,401 | 72.0 |
| 10 | 12 | 18 | 1,961 | 72.3 |
| 30 | 12 | 22 | 1,912 | 73.2 |
| 150 | 9 | 16 | 1,734 | 77.9 |

The increase in the rate of fertility obtained is of great economic importance since a dairyman loses the value of milk production for at least one heat period (21 days) when a dairy cow is not timely bred. It has been estimated that a 5 percentage point improvement in the fertility rate averages out to be worth about one dollar per cow per year, a considerable figure when multiplied by the number of dairy cows in the country.

We claim:

1. A method for increasing the fertility of animal semen preparations which comprises adding an effective amount of β-glucuronidase thereto.

2. A method according to claim 1 wherein said amount of β-glucuronidase is at least 10 Fishman units per milliliter of preparation.

3. A method for increasing the fertility of a bull semen preparation which comprises adding β glucuronidase thereto in an amount of at least 10 Fishman units per milliliter of preparation.

4. A animal semen preparation having an increased fertility comprising an animal semen and an effective amount of β-glucuronidase added thereto.

5. A bull semen preparation comprising bull semen extended with egg yolk citrate and at least 10 Fishman units per milliliter of preparation of added β-glucuronidase.

* * * * *